United States Patent [19]
Brackett

[11] Patent Number: 5,901,611
[45] Date of Patent: May 11, 1999

[54] PRE-SPINNING AND LUBRICATING SYSTEM FOR WORM DRIVE POWER TRANSMISSIONS AND BEARING ASSEMBLY COMPONENTS

[76] Inventor: Gregory W. Brackett, P.O. Box 1436, Inverness, Fla. 34451

[21] Appl. No.: 08/758,546

[22] Filed: Nov. 29, 1996

[51] Int. Cl.[6] .................................................. F16H 1/16
[52] U.S. Cl. ........................ 74/425; 184/6.12; 74/427; 384/472
[58] Field of Search .............................. 74/425, 427, 458, 74/465; 384/472, 517, 535; 184/6.12, 6.26, 55.1, 55.2, 29, 31

[56] References Cited

U.S. PATENT DOCUMENTS

| 3,820,413 | 6/1974 | Brackett | 74/425 |
| 4,651,586 | 3/1987 | Nemoto | 74/425 |
| 4,685,346 | 8/1987 | Brackett | 74/427 |
| 4,833,934 | 5/1989 | Boyko et al. | 74/425 |
| 5,242,033 | 9/1993 | Toraason | 184/6.12 |
| 5,341,901 | 8/1994 | Mueller et al. | 184/6.12 |
| 5,484,212 | 1/1996 | Guaraldi et al. | 184/55.1 X |
| 5,592,852 | 1/1997 | Parsons | 74/465 X |

FOREIGN PATENT DOCUMENTS

| 15654 | 7/1906 | United Kingdom | 74/465 |
| 358676 | 10/1931 | United Kingdom | 184/6.12 |

OTHER PUBLICATIONS

E.J. Stefanides, "Worm drive's roller wheel boosts speed, efficiency", Design News, pp. 88–89, Jan. 1983.

Primary Examiner—Richard M. Lorence
Assistant Examiner—David Fenstermacher
Attorney, Agent, or Firm—Chupa & Alberti, P.C.

[57] ABSTRACT

An apparatus for a ball bearing or needle bearing enclosure having an outside hardened raceway that accommodates two separate compliments of ball bearings located at each end of the raceway to engage with and support a central pin that protrudes cone shape out of the bearing enclosure at the front end to engage in contact with a screw thread. The total bearing and pin assembly is secure in a pocket in the worm wheel having a slip fit mating that allows the total bearing enclosure to move forward and back for a controlled distance against a spring washer of calculated pressure to accept the pressure generated from the cone shaped pin and screw thrust. The central pin is cored out to accept a spiral shaped object for the purpose of pre-spinning the central pin with a jet of pressurized air prior to engaging with the screw thread to eliminate any skidding action between the two surfaces. The jet of air is atomized with a lubricant to insure a spray mist of air and lubricant during the pre-spinning and pin and screw thread engagement activity.

6 Claims, 3 Drawing Sheets

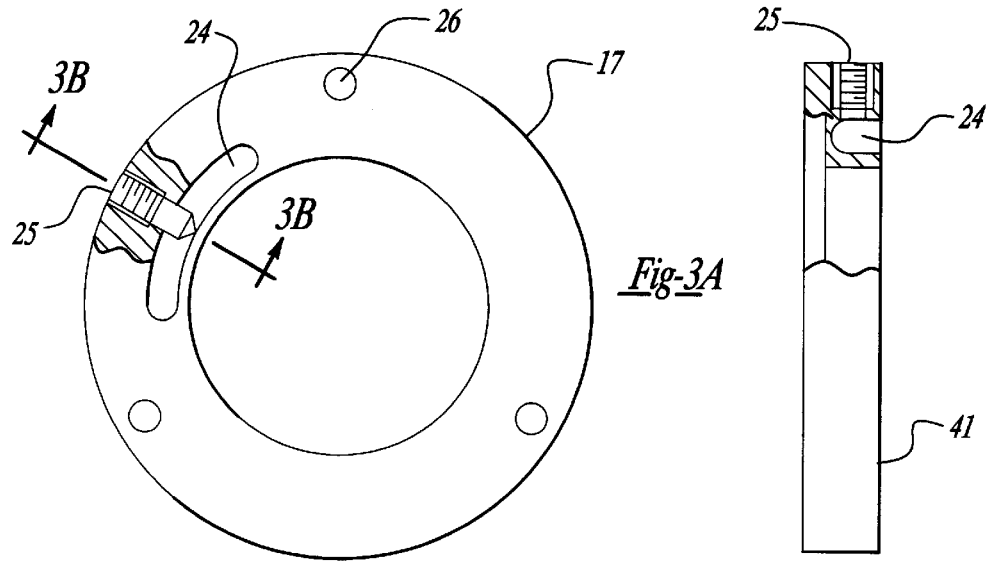
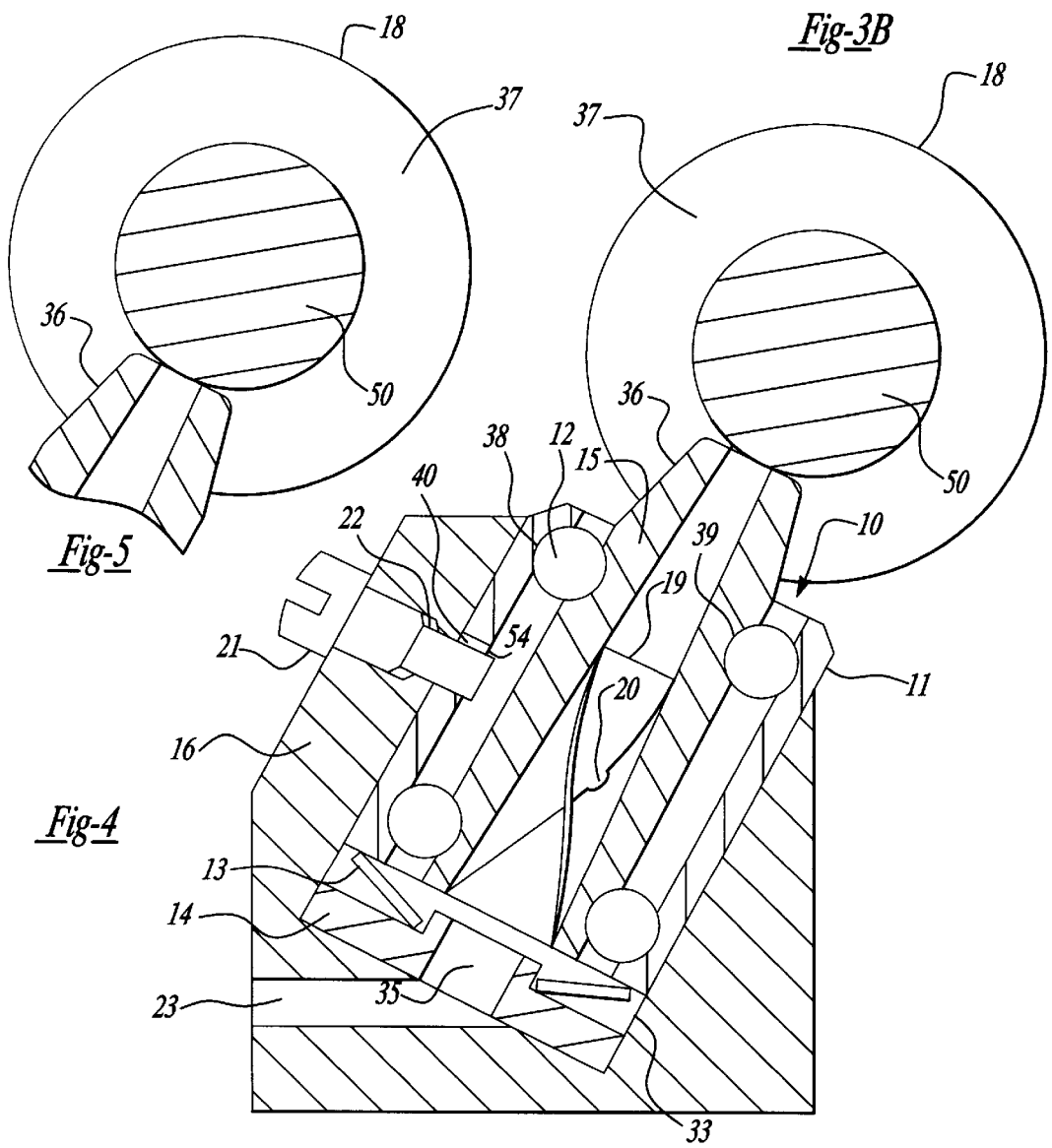

PRE-SPINNING AND LUBRICATING SYSTEM FOR WORM DRIVE POWER TRANSMISSIONS AND BEARING ASSEMBLY COMPONENTS

BACKGROUND OF INVENTION

1. Field of the Invention

The present invention relates to a pre-spinning and lubricating system for worm drive power transmissions and a new bearing assembly and components thereof.

2. Description of the Related Art

Conventional worm gear sets employ a worm screw and fixed tooth or roller tooth gear wheel. Although such worm gear sets are successful drive mechanisms at low speeds, their efficiencies are limited due to the rubbing or skidding contact between the teeth of the gear wheel and the screw thread of the worm screw.

Although the roller pin design is significantly more efficient than the solid tooth arrangement, further improvement in efficiency can be realized by a spray mist, pre-spin, lubricating system in place of the conventional method of an oil reservoir dip system. Submerging the roller pins in a lubricant at the bottom of the gear wheel cycle stops any spinning rotation of the roller pins that was gained from exiting the screw path causing a skidding action when re-entering the screw thread path. The Brackett U.S. Pat. No. 3,820,423 shows a solid roller pin design.

The Brackett patents employ separate bearing races supporting the front and the back bearings of the roller pins. The design has a limited capacity to withstand torque loads between the roller pins and the screw thread contact.

SUMMARY OF INVENTION

The problems and disadvantages of the prior art described above are overcome in accordance with the present invention by providing a bearing assembly that will carry significant heavier loads of conventional single bearing races and a pre-spin lubricating system that eliminates the skidding action of present roller pin designs and improve the efficiencies of conventional designs. The new bearing design includes a roller pin with a protruding cone projection to mate with the screw thread surface of the worm screw. The pin body is cored out leaving a wall thickness sufficient to withstand the prescribed loads and to reduce weight for pre-spinning. To regain the spinning action of the roller pin, to eliminate the skidding action on entry with the screw thread, a spiral shaped object is fitted and secured into the cored out center of the roller pin. The spiral shaped object acts as a turbine when a spray of mist of compressed air and lubricant is jetted through the opening in the roller pin. In the case of multiple roller pins on each side of the roller wheel the system is devised with a separate air flow hole for each pin that connects to the cored out center of the roller pins. A stationary valve plate is secured to the output shaft mounting plate with an air fitting hole drilled through to a rotary groove that lines up with at least three of the air flow holes of the roller pins. The rotary groove is positioned to service a jet of compressed air and lubricant to a span of at least two or three air holes of the roller pins as the worm wheel is rotating to regain the spinning action of the roller pins just before they enter the screw thread path.

The second important unit of the roller pin design would be the solid hardened outer bearing race that has a length equal to the length of the roller pin minus the length of the cone shaped protruding projection that mates with the screw thread surface. The outer bearing has grooves on the inside diameter that mate perfectly with the grooves of the roller pin to accept a compliment of needle bearings in the front and ball bearings in the rear. The rear groove are deeper facing the rear of the assembly to effect a thrust condition when torque is applied to the roller pin. This eliminates the necessity of a conventional thrust bearing to absorb the load when the torque is applied to the roller wheel.

In order to hold the roller pin and bearing race assembly in place in the roller wheel a threaded locking pin is screwed into a threaded hole in the roller wheel at a 90 degree angle from the center of the outer bearing race. A mating hole is drilled into the outer bearing race slightly larger than the diameter of the locking pin just off the center of the threaded hole so that locking pin bears up against the rear of the hole to hold the bearing assembly snugly against the spring washer and the hardened backup plate. The slightly larger diameter leaves a space to the front of the hole that allows the bearing assembly to slide forward and back and still remain locked in the pocket. The locking pin also prevents the outer bearing race from rotating while the roller pin is free to spin.

The new bearing design utilizes a single solid hardened outer ring with a compliment of preloaded ball bearings or needle bearings circulating in an inner groove at both ends of the solid hardened ring. The roller pin is supported by the same compliment of bearings mating with outer groove on both ends of the pin body. The roller pin serves as the inner race of a standard bearing incasement that creates a smaller diameter of the outer ring race. The solid hardened outer ring race creates a rigidity for the bearing assembly and significantly improves the load carrying capacity of a standard single bearing race utilized in the Brackett design. A further feature of the solid ring concept is that it unites the roller pin and outer race into a one piece assembly that enables the design to utilize a slide fit in the receptacle pocket bored in the worm wheel. A locking screw pin is threaded into the worm wheel ring at 90 degrees from the outer ring. A receiving hole is drilled into the outer ring that is slightly larger than the diameter of the locking pin. This allows the total assembly to slide a controlled distance against a spring washer of calculated pressure in the bottom of the receiving pocket and still remain trapped in the pocket. The locking screw pin enables the outer race to remain circularly motionless while the roller pin is free to spin.

BRIEF DESCRIPTION OF THE DRAWINGS

For a more complete understanding of the present invention, reference is made to the following detailed description of the various exemplary embodiments considered in conjunction with the accompanying drawings, in which:

FIG. 3 Is a cut away view of a stationary valve plate showing an air jet hole connecting to a rotary milled out pocket that spans at least two or three bearing assembly holes as the roller worm wheel rotates.

FIG. 4 Is a cross section view of the ball bearing assembly showing a spiral shaped object secured in the cored out center of the roller pin. It further shows a locking pin engaged in a slightly larger hole in the outer ring race than its diameter to allow the assembly to move a controlled distance against a spring washer and back up plate.

FIG. 5 Is a cut away view of a worm screw mating with a cone shaped projection of a roller pin.

EXEMPLARY EMBODIMENT DESCRIPTION

Figure 1:
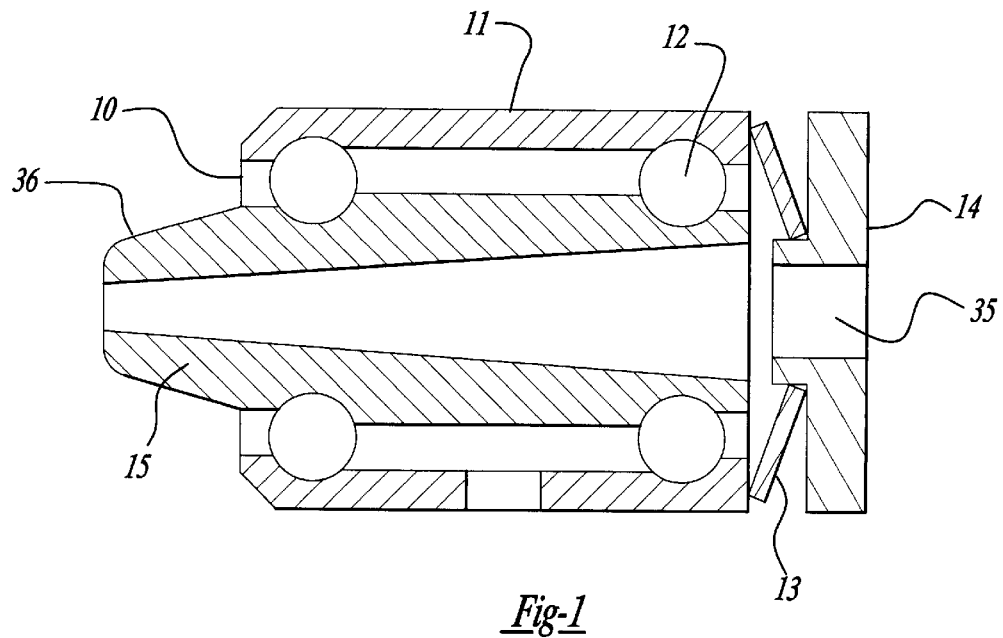
FIG. 1 is a cross section view of the ball bearing enclosure assembly showing a single solid hardened outer ring race, an inner race roller pin with a protruding cone shaped projection, a compliment of ball bearings and needle bearings located at each end of the outer ring and a spring washer and a hardened backup plate.
Figure 7:
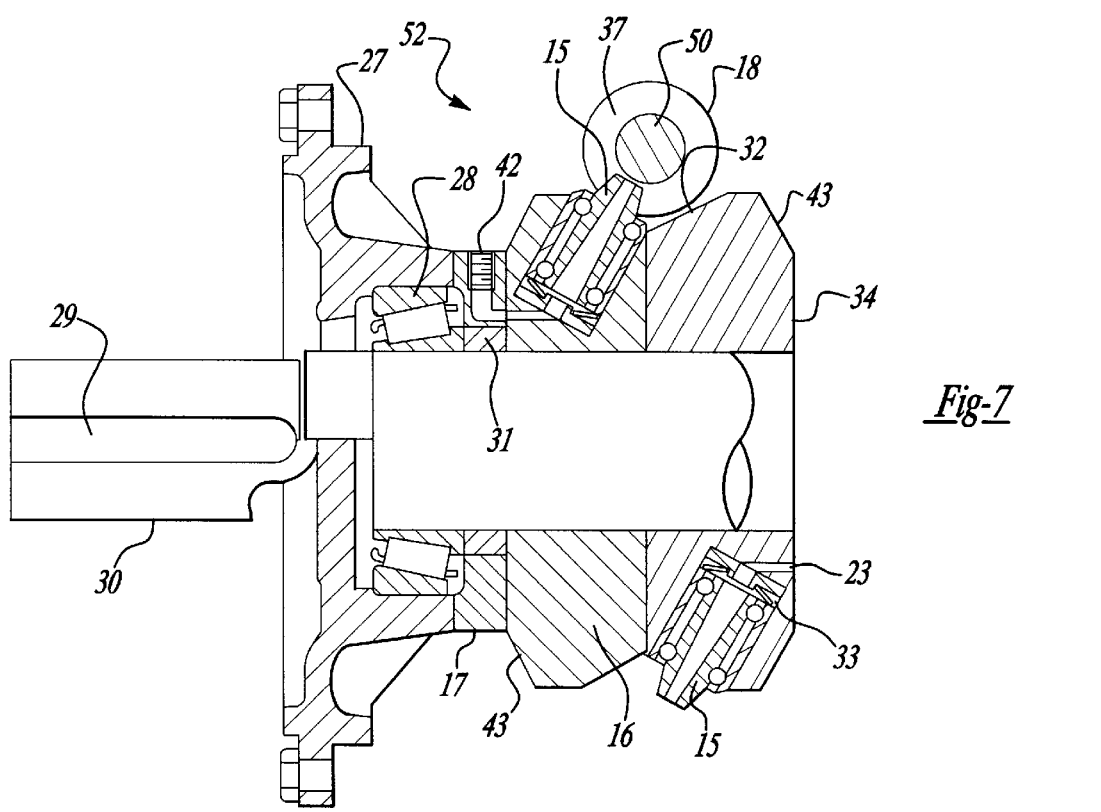
FIG. 7 Is an assembly view that includes an output shaft, main bearing, mounting plate, spacer ring, two halves of a roller worm wheel with the bearing assemblies inserted in bored out pockets in the roller wheels and an end cross section view of a worm screw.
Figure 8:
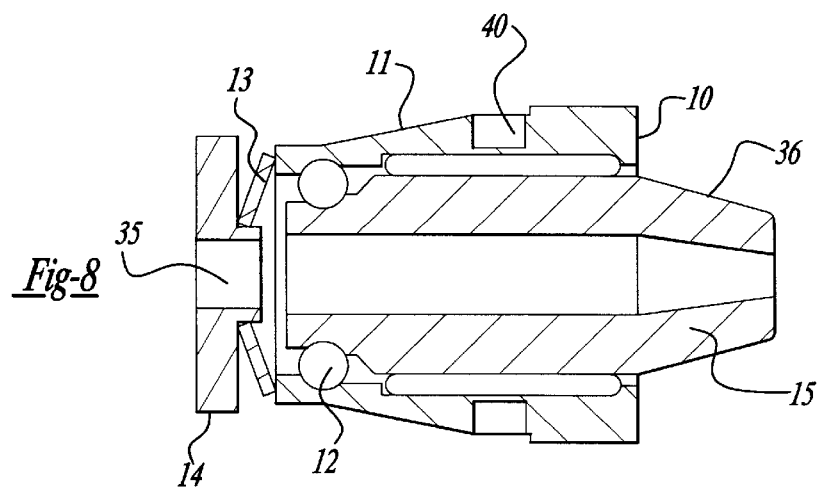
FIG. 8 Is a cross section view of a total bearing assembly with needle bearings in the front and ball bearings in the rear.

In reference to FIG. 7 that shows a worm drive system 52 that pre-spins and lubricates a roller pin 15 that engages in a worm screw 18 to drive a roller wheel 16. The roller wheel is attached to a rotating shaft 30 such that the roller wheel 16 rotates conjointly with the shaft 30 about a central longitudinal axis of the shaft 30. The worm screw 18 is attached to a rotatable shaft 50 such that the worm screw 18 rotates conjointly with the shaft 50 about a central longitudinal axis of the shaft. The roller wheel shaft 30 and the worm screw shaft 50 are arranged such that the power transfer from the worm screw shaft 50 to the roller wheel shaft 30 is at a 90 degree turn. The outer surface of the roller wheel 32 includes a number of bored holes 33 each of which is perpendicular to surface 32. A small air jet hole 23 is drilled at 90 degrees from surface 34 of the roller wheel to align with hole 35 in the backup plate 14, as shown in FIGS. 1 and 8. The bored holes 33 are a slip fit to accept the roller pin assembly 10 shown in FIGS. 1 and 8.

Figure 6:
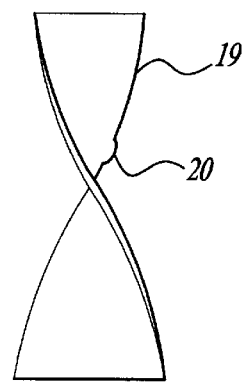
FIG. 6 Is a side and end view of a spiral shaped object for pre-spinning a roller pin.

Referring now to FIGS. 4 and 5, the roller pin assembly 10 consists of an outside hardened raceway ring 11 with two internal grooves 38 that accommodates two separate compliments of ball or needle bearings 12 located at each end of the raceway 11 to engage with two external grooves 39 and support a central roller pin 15 with a protruding cone shaped projection 36 mating with a screw thread 37 on the worm screw 18. The roller pin 15 is cored out to accept a spiral shaped object 19 (illustrated alone in FIG. 6) that acts as a turbine to spin the roller pin 15 when a jet of compressed air and lubricant is introduced through a hole 35 in the backup plate that connects with a hole 23 in the roller wheel 16. The spiral shaped object 19 is secured by a small protrusion on its edge locking into a hole 20 in the roller pin 15.

A locking pin 22 is threaded into the roller wheel 16 surface 43 and protrudes into the bored out pocket 33 and through a slightly larger hole 40 drilled through the outer ring race 11 than the locking pin diameter to allow the roller pin assembly 10 to lock snugly against a spring washer 13 and allows the total assembly 10 to move a controlled distance 54 against the spring washer 13 and the backup plate 14 when under the pressure. The locking pin 22 engagement in the slightly larger hole 40 prevents the roller pin assembly 10 from sliding out of the bored out pocket 33 and still allows the assembly 10 the freedom to move against the spring washer 13 when the cone shaped protrusion 36 of the roller pin 15 exerts thrust pressure against the spring washer 13 and the backup plate 14. The locking pin also prevents the outer ring race 11 from rotating while the roller pin is free to spin.

The backup plate 14 has a central hole 35 that aligns with a cross hole 23 in the roller wheel 16 from surface 34. When a jet of compressed air and lubricant flows through the cross hole 23 and the backup plate 35 it will cause the spiral shaped object 19 to pre-spin the roller pin 15 just prior to mating with the rotating screw path 37 to eliminate any skidding action between the roller pin 15 and the rotating screw path 37.

Figures 2A, 2B:
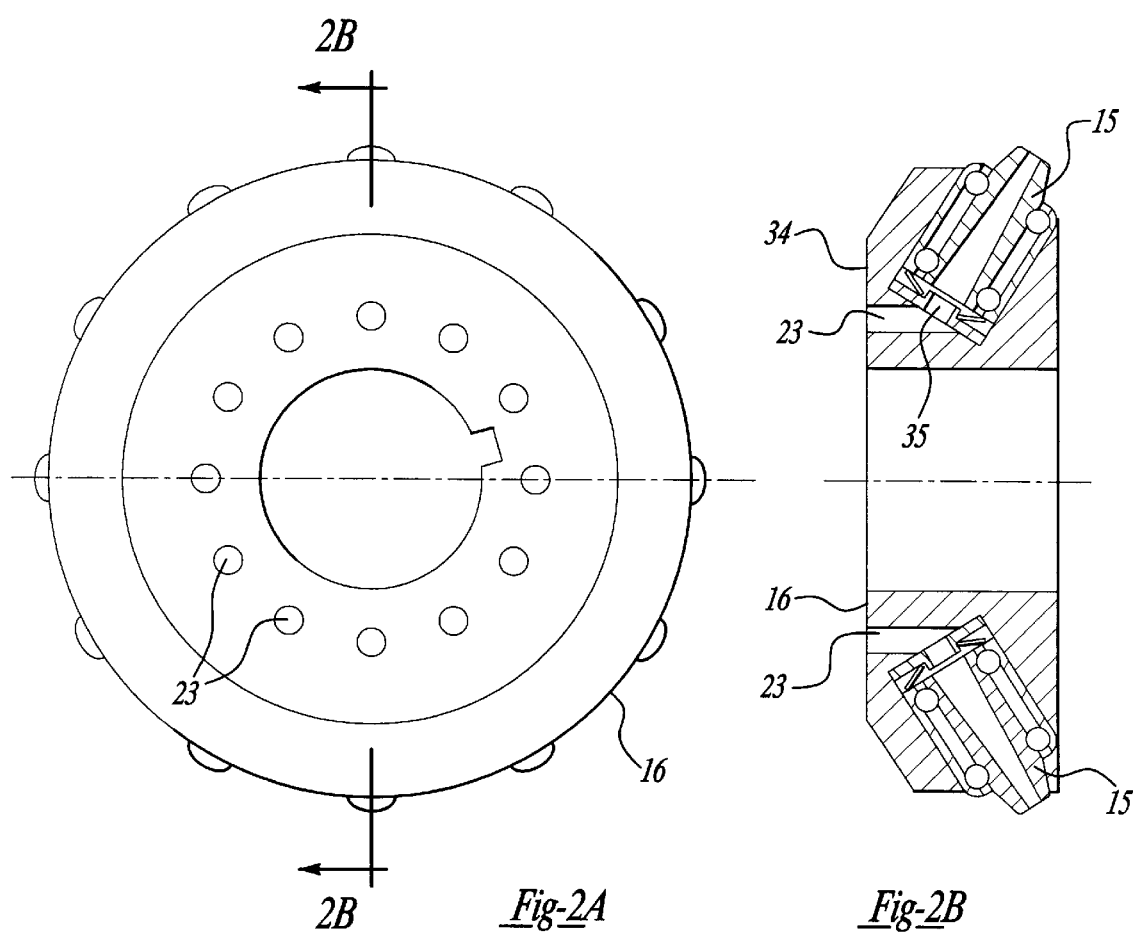
FIG. 2 Shows a cross section view of one half of the roller worm wheel with the ball bearing assemblies in place and aligned with the air jet holes.

Referring now to FIGS. 2, 3 and 7, to allow the roller pin 15 to pre-spin just before entry with the rotating screw path 37 a stationary valve plate 17 is fastened to bearing housing 27 by mounting holes 26 to be positioned against the surface 34 of the roller wheel 16 rotary groove 24 that is milled into surface 41 to align with at least two or three air holes 23 in a position just prior to the entry of the roller pin 15 mating with the rotary screw path 37. A jet of air and lubricant through a single air hole 42 connecting with the partial rotary groove 24 would pre-spin the roller pin 15 for a rolling entry into the rotating screw path 37. A spacer ring 31 is positioned between the inner race of the main bearing 28 and the surface 34 of the roller wheel 16 to allow the correct spacing of the valve plate 17 and to centralize the location of the worm screw 18.

I claim:

1. A worm drive construction for power transmission comprising a compressed gas lubricating system that channels a jet stream of compressed gas through a stationary valve plate connecting to a plurality of holes on a rotating worm wheel, said holes being connected to a plurality of roller pins, said stream of compressed gas thereby causing said roller pins to rotate.

2. A worm drive construction for power transmission that delivers a jet stream of compressed air and lubricant through a plurality of spiral shaped objects, each one of said plurality of spiral shaped objects positioned in a cored out center of one of a plurality of rotating roller pins causing said rotating roller pins to spin just prior to entry into a rotating screw thread path of a worm screw to eliminate skidding action between said roller pins and said screw thread path of said worm screw.

3. The worm drive construction for power transmission of claim 2 wherein said jet stream of compressed air and lubricant is delivered to a plurality of selected openings through a rotary pocket in a fixed valve plate that is aligned with at least two of said plurality of selected openings, each one of said plurality of selected openings being adapted to mate with one of said cored out centers of said plurality of rotating roller pins, thereby causing said spiral shaped objects fixed in said cored out openings to act as turbines to spin said roller pins just prior to entry into said screw thread path of said worm screw.

4. A worm drive construction for power transmission, said construction comprising:

a roller wheel having a bored out pocket; and a roller pin assembly, secured in said bored out pocket, having a plurality of bearings and an outer hardened raceway ring that accommodates at least two compliments of said bearings located at each end of said raceway ring in separate internal grooves which engage with and support a central roller pin having corresponding external grooves accommodating said compliments of said bearings.

5. The worm drive construction for power transmission of claim 4, wherein said roller pin assembly has a slip fit mating with said bored out pocket that allows said total bearing assembly to move a controlled distance against a spring washer of calculated pressure to accept said pressure generated from a cone shaped projection of said roller pin mating with said rotating worm screw path when torque loads are applied to said worm drive.

6. A worm drive system comprising a bearing assembly having an outer raceway ring that accommodates at least two bearings located on said raceway ring and rotating in separate internal grooves to engage with and support a central roller pin with corresponding external grooves, and is adapted to be locked in a bored out pocket of a worm wheel by a locking pin located in said worm wheel perpendicular to said outer raceway ring; said locking pin being adapted to protrude into said bored out pocket into a hole in said outer raceway, ring slightly larger than said locking pin diameter, said locking pin is further adapted to hold said outer raceway ring snugly against a spring washer when said worm drive system is not under torque loads, and to allow said outer raceway ring to move a controlled distance against said spring washer when said worm drive system is under said torque loads, and to prevent said outer raceway ring from rotating while said roller pin is free to spin.

* * * * *